United States Patent
Norell et al.

(10) Patent No.: US 11,718,275 B2
(45) Date of Patent: Aug. 8, 2023

(54) GRILL AND FLAPPER VALVE FOR A VACUUM CLEANER ASSEMBLY

(71) Applicant: SHOP VAC CORPORATION, Williamsport, PA (US)

(72) Inventors: Neil N. Norell, Candor, NY (US); Michael Z. Yurko, Endicott, NY (US)

(73) Assignee: SHOP VAC CORPORATION, Williamsport, PA (US)

( * ) Notice: Subject to any disclaimer, the term of this patent is extended or adjusted under 35 U.S.C. 154(b) by 762 days.

(21) Appl. No.: 16/545,737

(22) Filed: Aug. 20, 2019

(65) Prior Publication Data
US 2020/0062223 A1    Feb. 27, 2020

Related U.S. Application Data

(60) Provisional application No. 62/723,355, filed on Aug. 27, 2018.

(51) Int. Cl.
*B60S 1/64* (2006.01)
*A47L 9/14* (2006.01)
(Continued)

(52) U.S. Cl.
CPC ............... *B60S 1/64* (2013.01); *A47L 7/0076* (2013.01); *A47L 9/149* (2013.01); *A47L 9/1409* (2013.01); *A47L 9/248* (2013.01)

(58) Field of Classification Search
CPC .... A47L 9/1409; A47L 9/1445; A47L 9/1454; A47L 9/122; A47L 9/248; A47L 7/0076; B60S 1/64
See application file for complete search history.

(56) References Cited

U.S. PATENT DOCUMENTS 10,099,659 B1    10/2018  Williams et al.

FOREIGN PATENT DOCUMENTS

| CA | 3028888 A1 * | 7/2019 | ............... A47L 5/36 |
| EP | 1525839 A2 * | 4/2005 | ............... A47L 5/30 |

(Continued)

OTHER PUBLICATIONS

European Patent Application No. 19193183.1, Partial European Search Report, dated Jan. 27, 2020.

(Continued)

*Primary Examiner* — Bryan R Muller
(74) *Attorney, Agent, or Firm* — Marshall, Gerstein & Borun LLP

(57) ABSTRACT

A vacuum cleaner assembly configured to be mounted in a vehicle. The vacuum cleaner assembly includes a vacuum module and a collector module configured to collect debris and operatively coupled to the vacuum module. The collector module includes a canister assembly with an intake port, an output port, and a flapper valve coupled to the intake port. An elbow assembly couples the vacuum module to the collector module and includes an intake end attached to the output port of the canister assembly. The intake end has a foam section disposed on a grill insert. Upon removal of the canister assembly from the collector module, the flapper valve moves to a closed position over the intake port of the canister assembly to keep debris contained in the canister assembly, and the grill insert and the foam section remain in place in the intake end of the elbow assembly.

19 Claims, 9 Drawing Sheets

(51) Int. Cl.
*A47L 9/24* (2006.01)
*A47L 7/00* (2006.01)

(56) References Cited

FOREIGN PATENT DOCUMENTS

| EP | 3571971 A1 * | 11/2019 | ........... A47L 9/1454 |
|---|---|---|---|
| WO | WO-2018/017568 A2 | 1/2018 | |
| WO | WO-2018/017579 A2 | 1/2018 | |
| WO | WO-2018017568 A2 * | 1/2018 | ............... A47L 5/38 |

OTHER PUBLICATIONS

European Patent Application No. 19193183.1, Extended European Search Report, dated Jun. 29, 2020.

* cited by examiner

GRILL AND FLAPPER VALVE FOR A VACUUM CLEANER ASSEMBLY

CROSS-REFERENCE TO RELATED APPLICATION

Priority is claimed to U.S. Provisional Patent Application No. 62/723,355 filed Aug. 27, 2019, the entire contents of which are hereby incorporated herein by reference.

FIELD OF THE INVENTION

The present invention relates generally to a modular vacuum cleaner assembly configured to be mounted in a vehicle and, in particular, to a grill and a flapper valve for a modular vacuum cleaner assembly.

BACKGROUND

In order to clean a vehicle, such as a car or truck, a vacuum cleaner is often used to vacuum out dirt and debris. However, it can be awkward and/or inconvenient to use a typical in-home vacuum cleaner to clean out the interior of a vehicle. To address this inconvenience, attempts have been made to permanently install on-board vehicle vacuum cleaners inside the vehicle. However, the known on-board vehicle vacuum cleaners typically have a complex and dedicated installation arrangement, which limits the usage across different vehicles and/or in different arrangements within a vehicle.

In addition, removal of the vacuum cleaner assembly in a dedicated installation arrangement within the vehicle may be time consuming and difficult. For example, it is often difficult for users to access one or more devices or parts used to help remove the vacuum cleaner assembly from a desired location, such as to remove debris collected in the vacuum cleaner assembly, particularly without spilling the debris. In addition, while some parts may be relatively accessible, they can be heavy or cumbersome to handle, further adding to the difficulties in removing such vacuum cleaner assemblies from various positions within a vehicle.

Further, in many conventional vacuum cleaner assemblies, debris inadvertently enters an airflow path of a duct of the vacuum cleaner assembly during use, for example, interfering with cleanliness of the airflow path during operation. In still other conventional vacuum cleaner assemblies, debris often spills out of the canister during removal of the canister from the vacuum cleaner assembly. As a result, the debris falls into other parts of the vacuum cleaner assembly along with the surrounding area the vacuum cleaner assembly is disposed, requiring further time and efforts to property dispose of the debris.

SUMMARY OF THE DISCLOSURE

In accordance with a first exemplary aspect of the present disclosure, a vacuum cleaner assembly is configured to be mounted in a vehicle and comprises a vacuum module configured to draw a vacuum and a collector module configured to collect debris and operatively coupled to the vacuum module. The collector module has a canister assembly including an intake port, an output port, and a flapper valve coupled to the intake port. In addition, an elbow assembly couples the vacuum module to the collector module and has an intake end attached to the output port of the canister assembly. The intake end includes a foam section disposed on a grill insert for maintaining the foam section in place. Upon removal of the canister assembly from the collector module, the flapper valve moves to a closed position over the intake port of the canister assembly to keep debris contained in the canister assembly, and the grill insert and the foam section remain in place in the intake end of the elbow assembly.

In accordance with another exemplary aspect of the present disclosure, a vacuum cleaner assembly is configured to be mounted in a vehicle and comprises a vacuum unit configured to draw a vacuum and a collector configured to collect debris and operatively coupled to the vacuum unit. The collector module has a canister assembly including an intake port and an output port. In addition, an elbow assembly couples the vacuum unit to the collector and has an intake end attached to the output port of the canister assembly. The intake end includes a foam section disposed on a grill insert for maintaining the foam section in place. Upon removal of the canister assembly from the collector, the foam section remains in place in the intake end of the elbow assembly.

In accordance with yet another aspect of the present disclosure, a vacuum cleaner assembly is configured to be mounted in a vehicle and comprises a vacuum unit configured to draw a vacuum and a collector configured to collect debris and operatively coupled to the vacuum unit. The collector has a liner and a canister assembly configured to be disposed on the liner. The canister assembly has an intake port, an output port, and a flapper valve attached to the intake port. Upon removal of the canister assembly from the collector, the flapper valve moves to a closed position to keep debris contained in the canister assembly.

In further accordance with any one or more of the exemplary aspects, a modular vacuum cleaner assembly may optionally include any one or more of the following preferred forms.

In some preferred forms, the grill insert may be disposed in an angled position within the intake end of the elbow assembly to maintain the foam section in place within the elbow assembly. In addition, the grill insert may be disposed within and locks into the intake end of the elbow assembly at a 45 degree angle location, the foam section disposed closer to an opening in the intake end of the elbow assembly than the grill insert.

In other preferred forms, the grill insert may include a surface having at least one barbed portion extending from the surface. In addition, the foam section may be disposed on the surface into the at least one barbed portion, such that the at least one barbed portion holds and secures the foam section to the grill insert.

In yet another preferred form, the flapper valve may have a moveable member disposed in a hinged configuration about the intake port, and the moveable member may be biased in a closed position over the port. Further, the canister assembly may further comprise a canister having a bottom portion and a locking member disposed on the bottom portion of the canister.

In still other preferred forms, the moveable member may have an outside surface with a projection extending therefrom, such that when the moveable member is moved to a fully open position, the projection snaps over the locking member. In addition, when the canister assembly is lowered into the liner of the collector module, the flapper valve may be disposed in a fully open position, and a tab of the flapper valve may contact an angled portion of the liner, forcing the projection of the flapper valve to become detached from the locking member.

In other preferred forms, when the canister assembly is disposed within the liner, the moveable member may move in a direction to contact an edge of the liner, and the moveable member may be in an open position for the operation of the vacuum cleaner assembly.

In still yet other preferred forms, the grill insert may be disposed within and locked into the intake end of the elbow assembly at a 45 degree angle position, and the foam section may be disposed between an opening in the intake end of the elbow assembly and the grill insert. In addition, the 45 degree angle position may have a greater cross-sectional area than other positions disposed within the elbow assembly.

Additional optional aspects, arrangements, forms, and/or advantages of the vacuum cleaners disclosed herein will be apparent upon consideration of the following detailed description and the appended drawings, each different functionally operable and technically effective combination of which is expressly included as a part of the present disclosure.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DETAILED DESCRIPTION

A vacuum cleaner assembly configured to be mounted in a vehicle is disclosed. The vacuum cleaner assembly includes a vacuum module configured to draw a vacuum, a collector module configured to collect debris and operatively coupled to the vacuum module. The collector module includes a liner and a canister assembly configured to be disposed on the liner, and the canister assembly includes an intake port, an output port, and a flapper valve attached to the intake port. An elbow assembly couples the vacuum module to the collector module and includes an intake end attached to the output port of the canister assembly. The intake end includes a foam section disposed on a grill insert, the grill insert for maintaining the foam section in place. The foam section helps prevent debris and/or any other materials from entering a flow path of the elbow assembly during use of the vacuum cleaner assembly and/or when the canister assembly is removed from the liner of the vacuum cleaner assembly to dispose of debris collected in the canister, for example. In addition, upon removal of the canister assembly from the collector module, the flapper valve automatically moves to a closed position to keep debris contained in the canister assembly while the foam section and grill insert remain in place in the elbow assembly.

Figure 1:
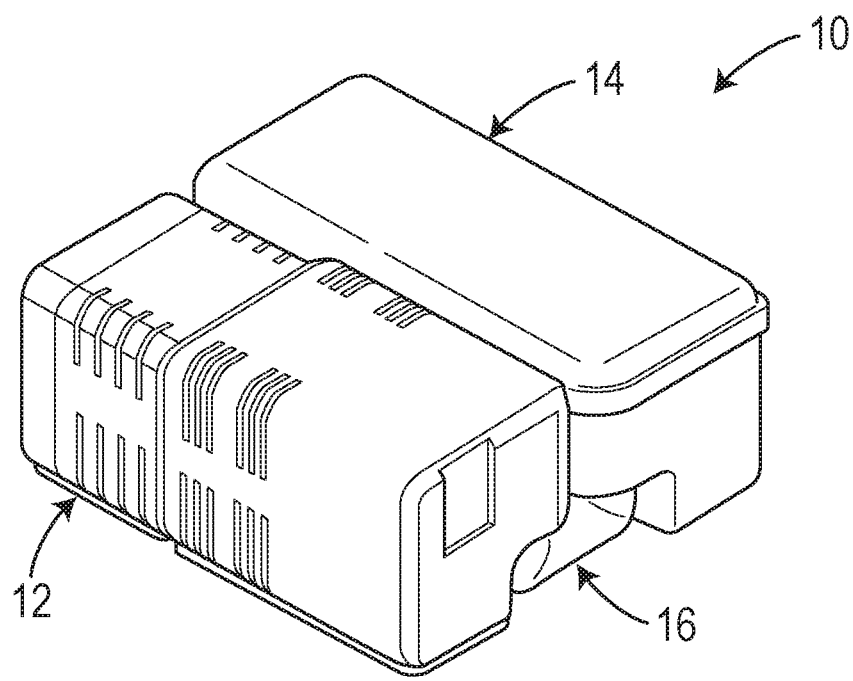
FIG. 1 is an front, perspective view of a vacuum cleaner assembly configured to be mounted in a vehicle according to the present disclosure.
Figure 2:
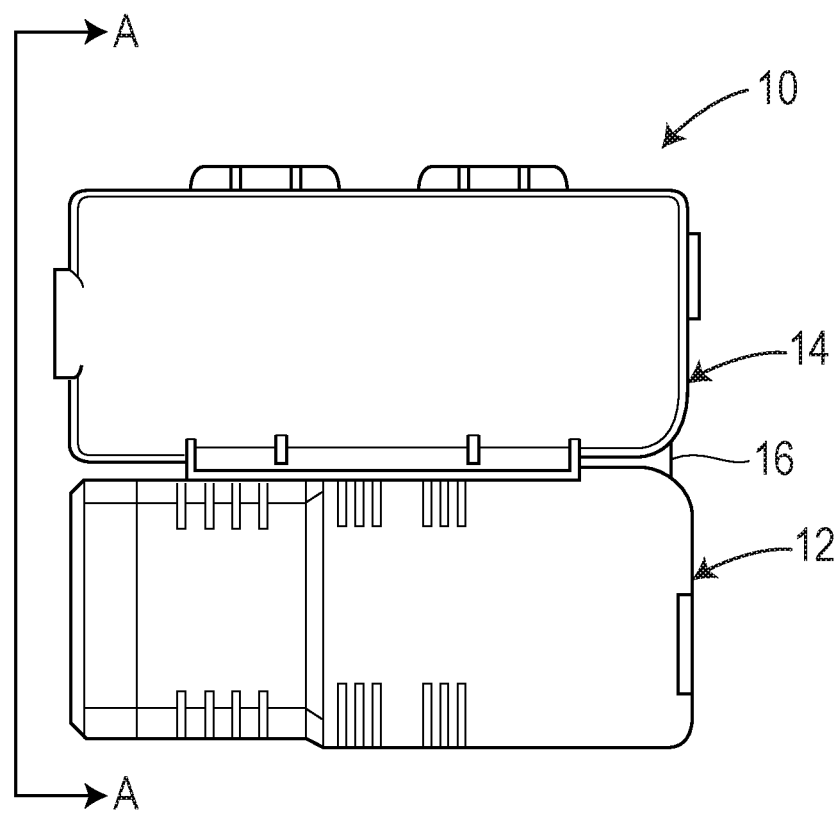
FIG. 2 is a top view of the vacuum cleaner assembly of FIG. 1.
Figure 3:
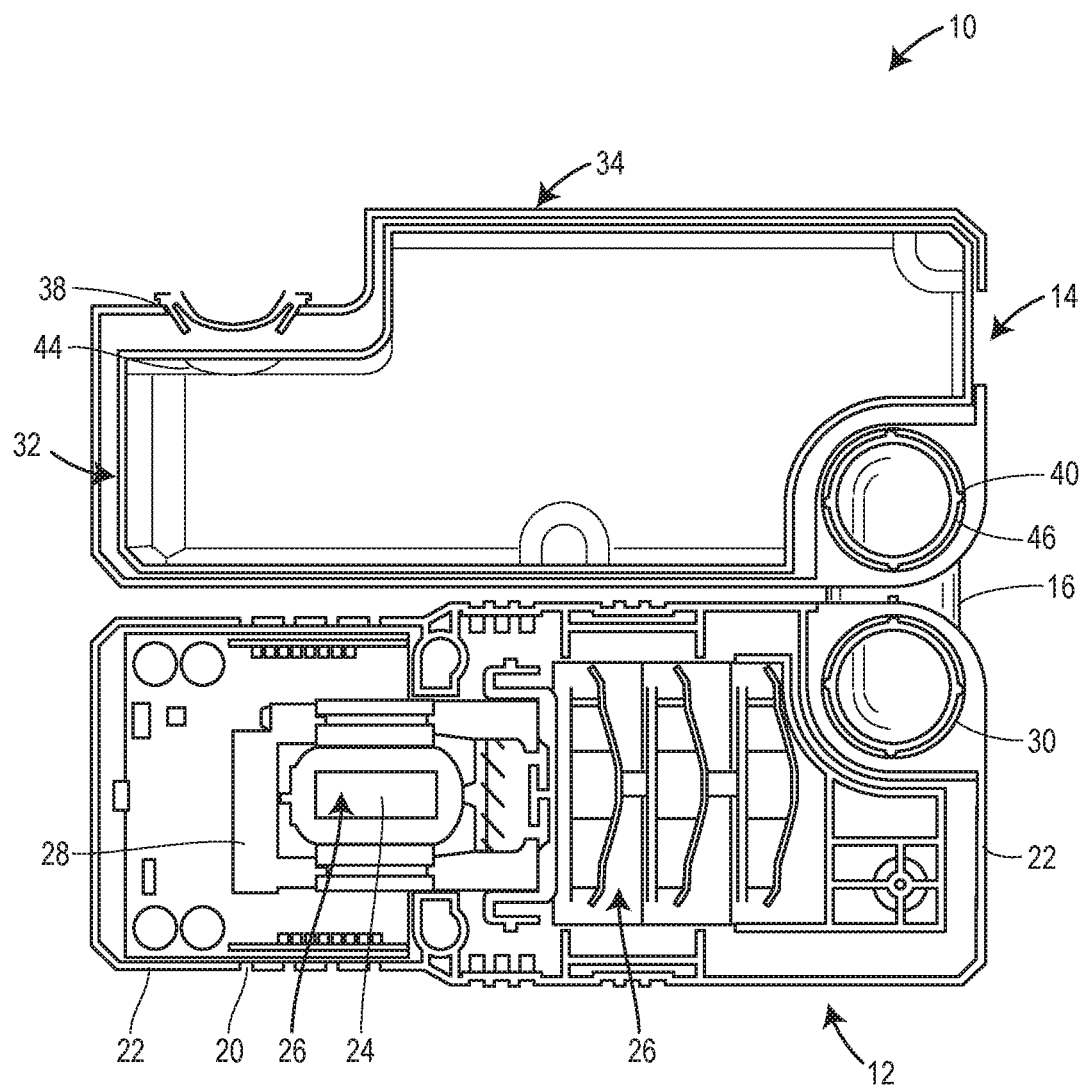
FIG. 3 is a top, sectional view of the vacuum cleaner assembly of FIG. 2, taken along the lines A-A of FIG. 2.

More specifically, and referring now to FIGS. 1-3, a vacuum cleaner assembly 10 having a grill insert and a flapper valve according the present disclosure is depicted. The vacuum cleaner assembly 10 is configured to be installed and operated within a vehicle, such as a car or truck or other type of vehicle, as explained more below. Preferably, the vacuum cleaner assembly 10 is configured to be installed within a passenger compartment of the vehicle to provide easy access and use of the vacuum cleaner assembly for cleaning the interior of the passenger compartment.

The vacuum cleaner assembly 10 has a modular configuration, including a vacuum module 12 and a collector module 14 that can be connected to each other as an integrated unit in any of a plurality of different pre-defined assembly arrangements with an interconnecting duct, such as an elbow assembly 16. The elbow assembly 16 may not be flexible, but rather can have a fixed pre-defined shape that allows the collector module 14 to be operatively connected to the vacuum module 12 in only a limited number of predefined assembly arrangements. For example, while FIGS. 1-3 depict the vacuum cleaner assembly 10 with the collector module 14 operatively connected to the vacuum module 12 in a side-by-side configuration, the vacuum cleaner assembly 10 may alternatively be disposed in an in-line configuration or an upright installation orientation, as disclosed in the following patents or patent applications, which are each herein incorporated by reference in its entirety: PCT Publication Nos. WO 2018/017568, WO 2018/017579, and WO 2018/017572.

Because of its modular configuration, the vacuum cleaner assembly 10 can be easily assembled and/or oriented in many different shapes and orientations. As a result, one can easily configure the vacuum cleaner assembly 10 to fit different shapes and/or configurations of receptacle spaces within a vehicle, while maintaining the vacuum cleaner assembly 10 as an integrated unit. For example, the vacuum cleaner assembly 10 may be configured and oriented to fit in a space between seats, such as within a center console. Alternatively, the vacuum cleaner assembly 10 may be configured and oriented to fit on the side or underneath a seat, in a space along the side wall of a cargo bay or passenger compartment of a sport utility vehicle (SUV) or in the trunk. However, because the elbow assembly 16 can have a substantially rigid shape and couples the collector module 14 to the vacuum module 12 in pre-defined orientations as an integral unit, the vacuum cleaner assembly 10 can be easily installed and/or removed and/or otherwise moved around as a single unit, which may provide easier handling of the vacuum cleaner assembly 10 as compared to a vacuum cleaner assembly that is not connected together as an integrated unit.

Figure 13:
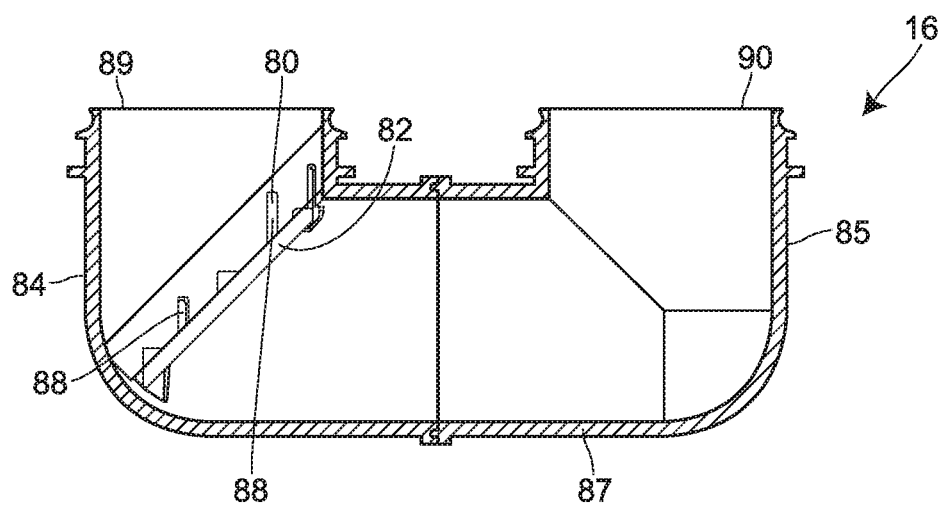
FIG. 13 is a sectional view of the elbow assembly of FIG. 12 depicting an exemplary airflow path through the elbow assembly.

As depicted in FIG. 2, the elbow assembly 16 of the vacuum cleaner assembly 10 is configured to operatively couple the collector module 14 to the vacuum module 12 in the side-by-side configuration. In this example, the elbow assembly 16 has a substantially rigid body. Alternatively, and as one of ordinary skill in the art will appreciate, the elbow assembly 16 may be flexible in form. In addition, the body of the elbow assembly 16 is a U-shaped tube, as depicted in FIG. 13 and explained more below. The elbow assembly 16 may alternatively take the form of various other shapes and still fall within the scope of the present disclosure.

Referring now to FIG. 3, the vacuum module 12 includes a motor/impeller unit 20 within a motor housing 22. The motor housing 22 has an outer shell with a generally elongate rectangular form. The motor housing 22 may take many different forms and shapes and sizes depending upon the particular space needs and/or arrangements desired for installation in a particular vehicle and still fall within the scope of the present disclosure. The motor/impeller unit 20 includes a motor 24 that drives an impeller assembly 26, and a controller 28 that controls the motor 24. The motor 24 can be of any design suitable for vacuum cleaners, including standard motors with brushes or brushless motors, and switched reluctance motors. The impeller assembly 26 may take any form suitable for moving air in a manner that will create a vacuum. In this arrangement, the impeller assembly 26 includes three in-line impellers. However, other forms of the impeller assembly 26 may also be used. The motor 24 is operatively coupled to the impeller assembly 26 to drive the impellers to create a vacuum. The controller 28 includes suitable electronics, such as a PCB board and/or other appropriate electronic control circuits configured to control the motor 24. As also depicted in FIG. 3, the motor housing 22 includes an intake opening 30 that forms a duct receiver and an air inlet for air that is drawn into the impeller assembly 26.

Figure 4:
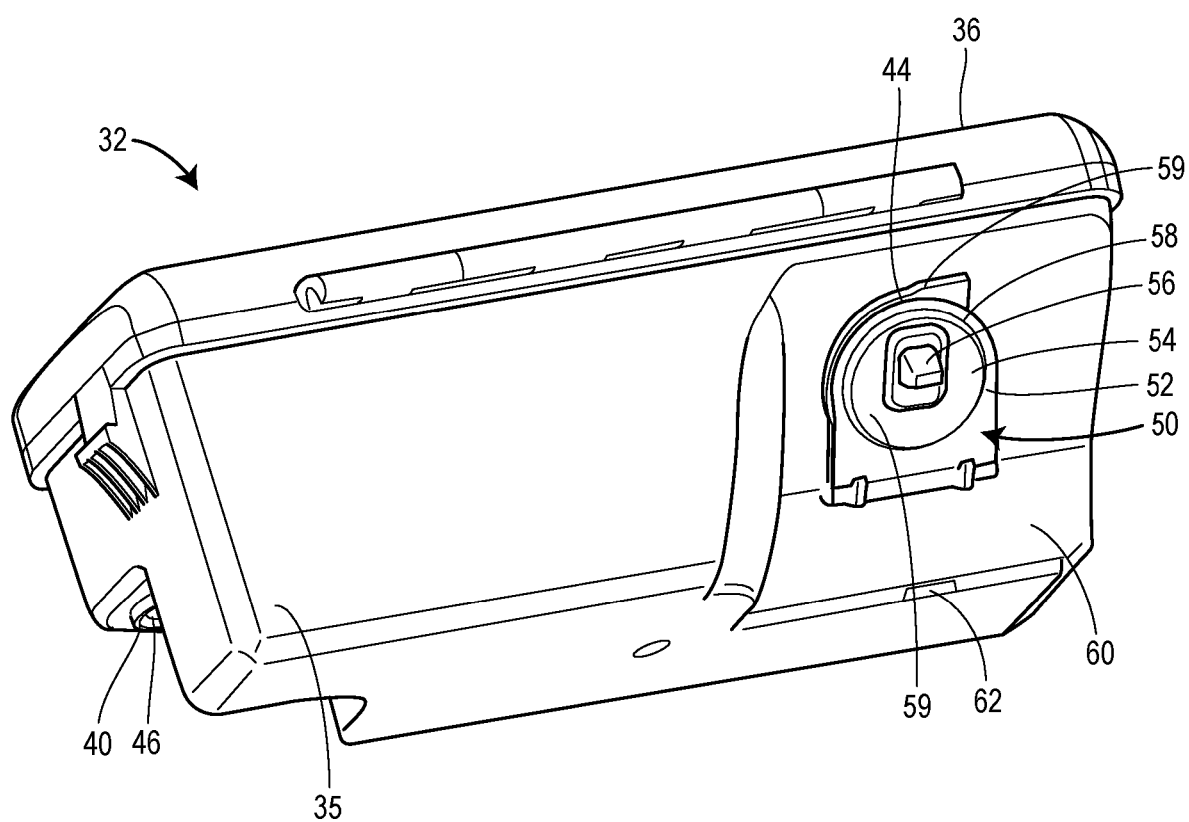
FIG. 4 is a rear, perspective view of a canister assembly of the vacuum cleaner assembly of FIG. 1 with a flapper valve assembly in a closed position.
Figure 5:
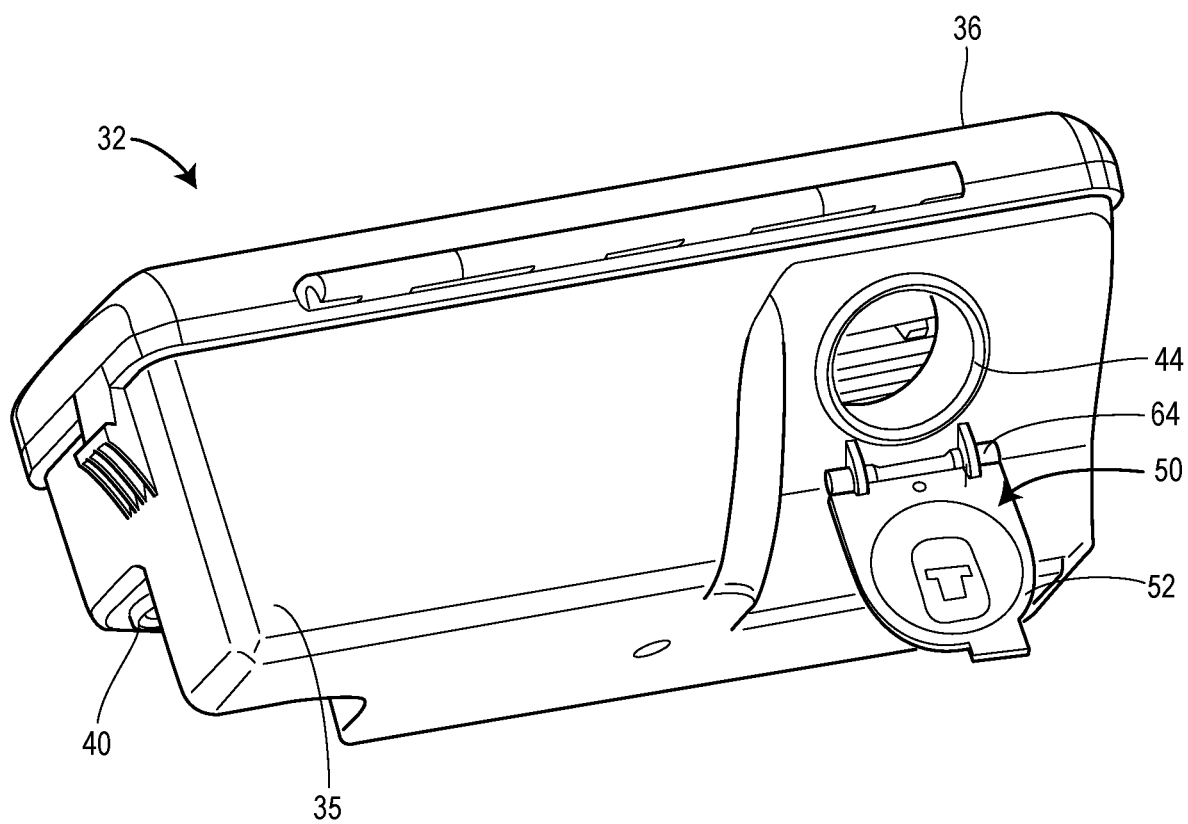
FIG. 5 is another rear, perspective view of the canister assembly of the vacuum cleaner assembly of FIG. 1 with the flapper valve assembly in an open position.
Figure 7:
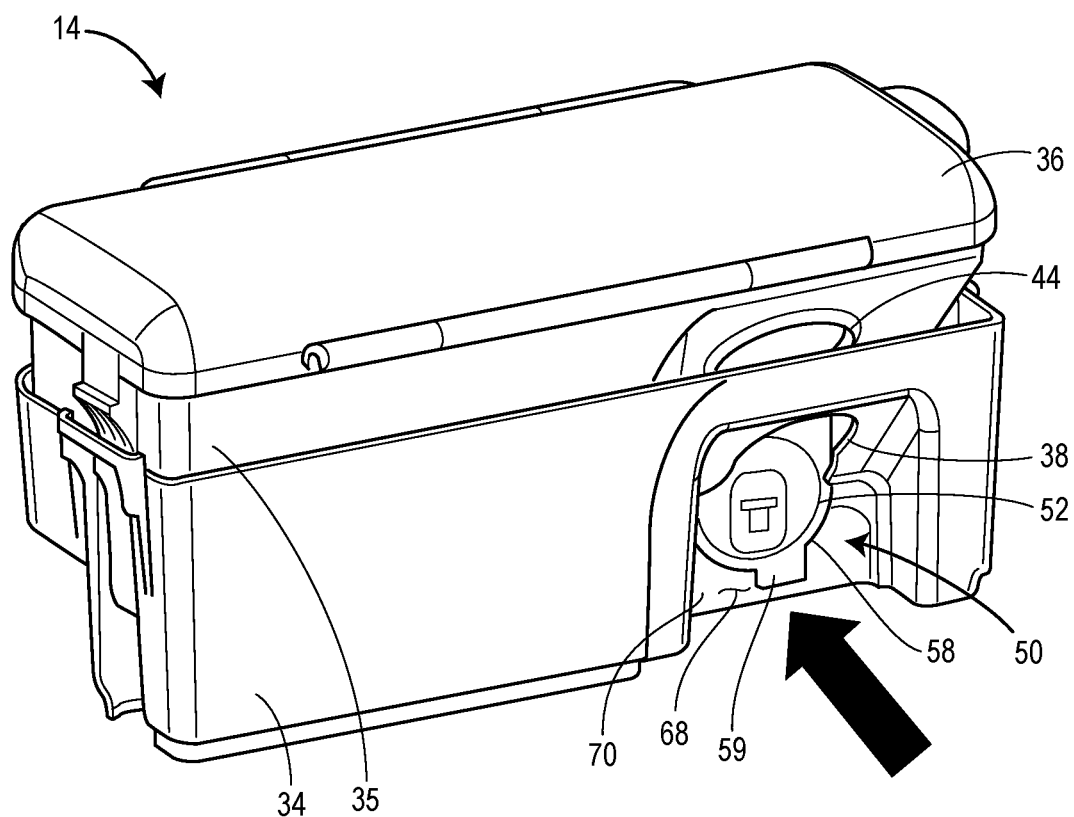
FIG. 7 is another rear, perspective view of the canister assembly of FIG. 5 being inserted into a liner of the vacuum cleaner assembly.

Still referring to FIG. 3, the collector module 14 includes a canister assembly 32 disposed within a collector housing, such as a liner 34. The canister assembly 32 includes a canister 35 and a lid 36 (see, e.g., FIGS. 4 and 5) that can be selectively opened to provide access to a canister 35 of the canister assembly 32. The canister assembly 32 is removably received within the liner 34 such that the canister assembly 32 can be slidably removed from and returned into the liner 34. The collector housing, such as the liner 34, also includes an air intake opening 38 at one end of the housing and an air exhaust opening 40 in the opposite end of the collector housing 34, as also depicted in FIGS. 4 and 5, for example, and explained more below. In a similar manner, the canister assembly 32 includes an air intake port 44 and an air output port 46. The air intake port 44 and the air output port 46 of the canister assembly 32 align with the air intake opening 38 and the air exhaust opening 40 of the liner 34, respectively, when the canister assembly 32 is operatively disposed within the liner 34, as depicted in FIG. 7, for example.

Figure 6:
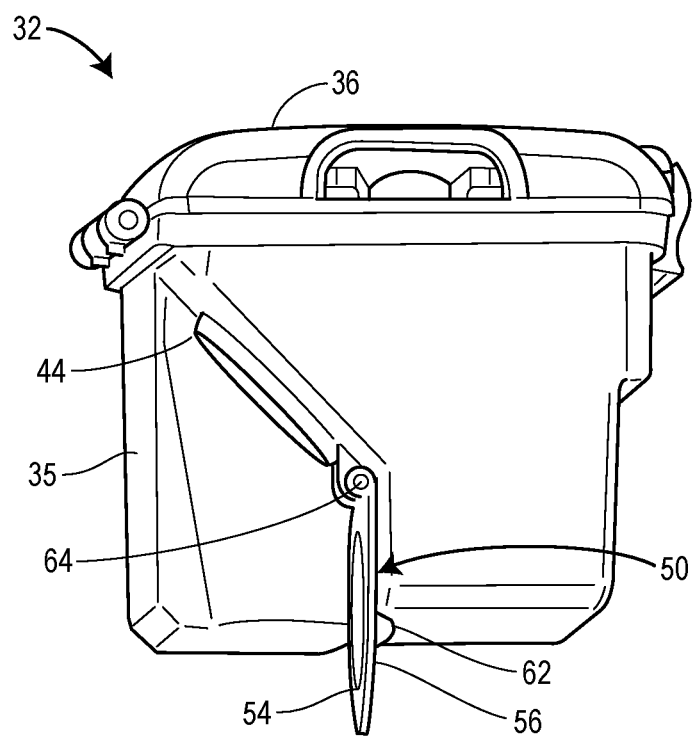
FIG. 6 is a side, perspective view of the canister assembly of the vacuum cleaner assembly of FIG. 5.

Referring now to FIGS. 4-6, the canister assembly 32 only of the collector module 14 is depicted, entirely removed from the liner 34 of the collector module 14. The canister assembly 32 includes a flapper valve 50 coupled to the air intake port 44. In FIG. 4, the flapper valve 50 is depicted in a closed position over the air intake port 44 of the canister assembly 32. The flapper valve 50 includes a moveable member 52, such as a door, disposed in a hinged configuration over the air intake port 44. The moveable member 52 is biased in the closed position over the air intake port 44. In one example, the moveable member 52 is spring loaded in a closed position over the air intake port 44 and may alternatively be biased in the closed position depicted in FIG. 4 by various other known means. The moveable member 52 further includes an outside surface 54 having a projection 56 outwardly extending from a center area 57 of the outside surface 54. The moveable member 52 also includes an outer edge 58 having a tab 59 extending therefrom and explained more below. In one example, and as depicted in FIG. 7A, the tab 59 is rectangular in shape. However, the tab 59 may take the form of various other shapes and still fall within the scope of the present disclosure. As explained more below, during removal of the canister 35 from the liner 34, the tab 59 helps control the closing of the moveable member 52 and guide it away from a seal used with the hose.

In addition, and as also depicted in FIG. 4, the canister 35 of the canister assembly 32 further includes a bottom portion 60 having a locking member 62. The projection 56 extending from the outside surface 54 of the moveable member 52 of the flapper valve 50 snaps over the locking member 62 when the moveable member 52 is in a fully open position, as depicted in FIG. 6 and explained more below.

Referring now to FIGS. 5 and 6, the moveable member 52 of the flapper valve 50 is moved to an open position (by an operator) before loading the canister assembly 32 into the liner 34 of the collector module 14 of the vacuum assembly 10. Because the moveable member 52 is biased in a closed position over the air intake port 44 of the canister assembly 32, the operator needs to move moveable member 52 from the closed position, depicted in FIG. 4, for example to the open position. To move the moveable member 52 into the open position, the moveable member 52 is rotated in a direction away from the intake port 44, such as a downward direction, by way of hinges 64 that couple the flapper valve 50 to the canister assembly 32. The moveable member 52 is rotated until the projection 56 is snapped over and locked by the locking member 62 of the canister 35. So configured, when in the fully open position, the projection 56 and locking member 62 together create a latch mechanism 66 to secure the moveable member 52 in the fully open position. In this manner, the flapper valve 50 is moved from a closed position to a locked and fully open position, and the latch mechanism 66 secures the flapper valve 50 in the fully open position.

Referring now to FIG. 7A, the canister assembly 32 of the collector module 14 is depicted being lowered into the liner 34. More specifically, as the canister assembly 32 is initially lowered into the liner 34, the flapper valve 50 is disposed in a fully open position. Upon further movement into the liner 34, the tab 59 of the moveable member 52 contacts an angled portion 68 disposed on an inside surface 70 of the liner 34. As a result, the projection 56 disposed on the outside surface 54 of the flapper valve breaks away or becomes detached from the locking member 62 of the canister 35. In other words, this contact forces the latch mechanism 66, which includes the projection 56 of the moveable member 52 snapped over the locking member 62, to become unlatched, allowing the moveable member 52 to be detached from the locking member 62 in the open position, for example.

Figure 8:
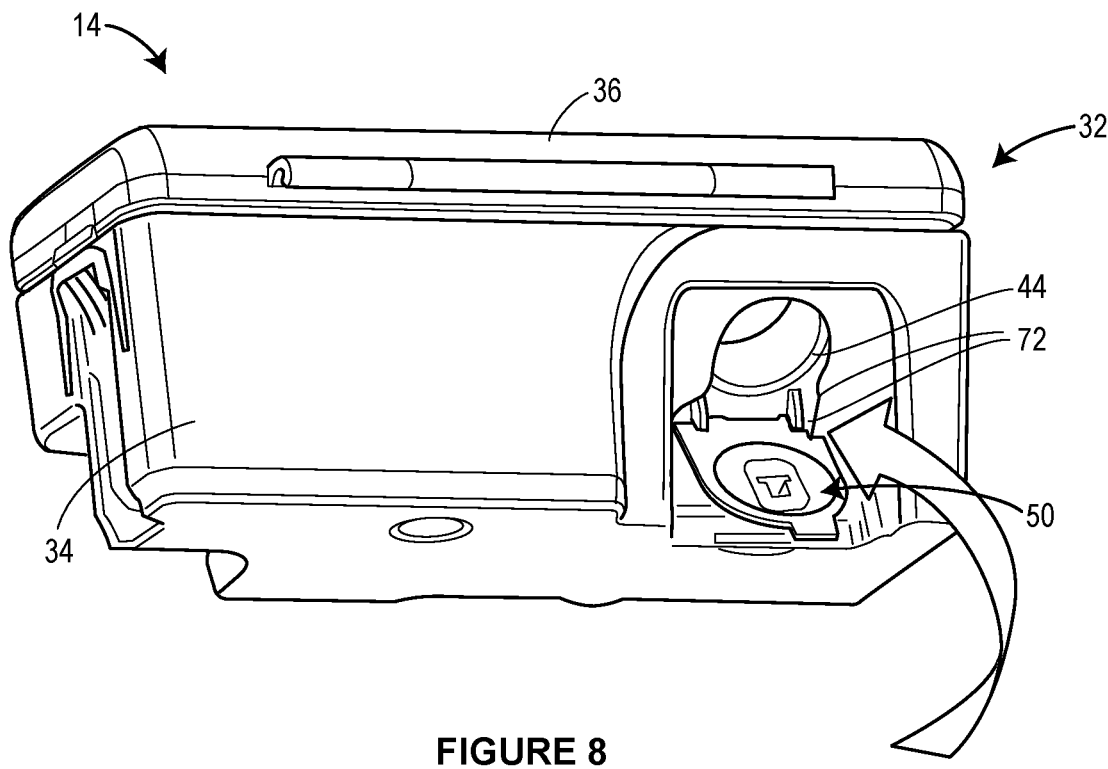
FIG. 8 is a rear, perspective view of the canister assembly disposed within the liner of the vacuum cleaner assembly.

Referring now to FIG. 8, the canister assembly 32 is depicted completely disposed within the liner 34. Once the projection 56 becomes detached from the locking member 62 of the canister 35 (see, e.g., FIG. 7), and because the flapper valve 50 is biased in a closed position, the moveable member 52 of the flapper valve 50 automatically swings or moves in an upward direction to contact an edge 72 of the liner 34. In this position, the moveable member 52 of the flapper valve 50 is in an open position and a hose (not depicted) is able to be attached to the air intake port 44 of the canister assembly 32, allowing the vacuum cleaner assembly 10 to be in used, for example.

Figure 9A:
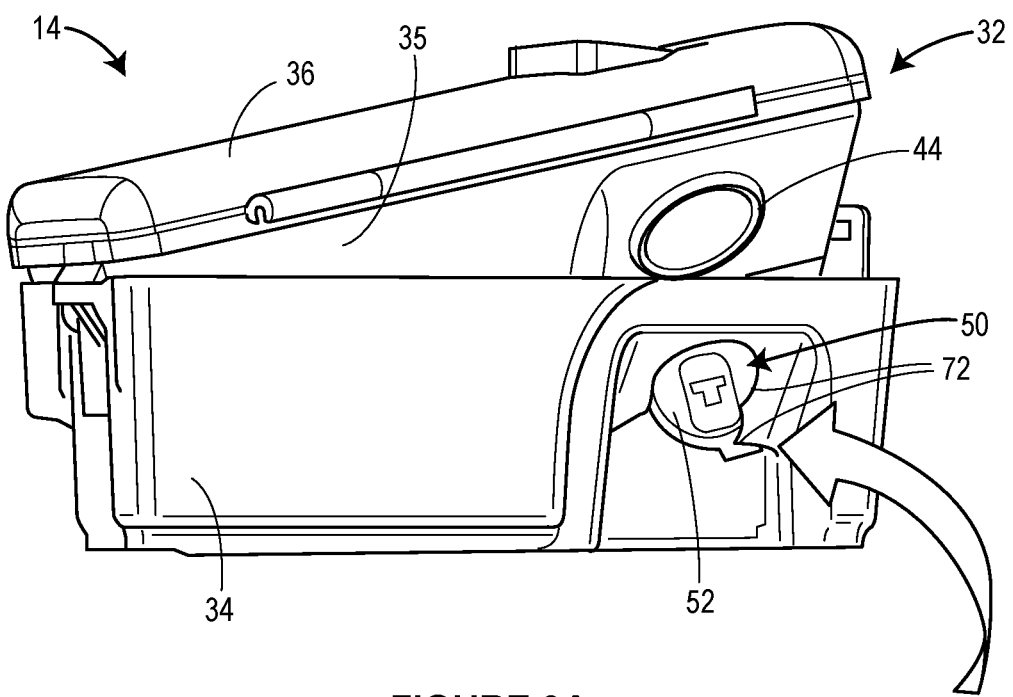
FIG. 9A is a rear, perspective view of the canister assembly of the vacuum cleaner assembly, the canister assembly being pulled out of the liner of the vacuum cleaner assembly.

As depicted in FIG. 9A, when it is desired to remove the canister assembly 32 from the liner 34 of the collector module 14, the flapper valve 50 stays attached to the canister 35, and the moveable member 52 of the flapper valve 50 initially continues to ride along the edge 72 of the liner 34. Once the moveable member 52 of the flapper valve 50 clears the liner edge 72, the moveable member 52 rotates back into the closed position (see, e.g., FIG. 4), covering the air intake port 44. So configured, this helps to retain any debris disposed in the canister 35 and prevents debris from falling out during removal of the canister assembly 32.

Figure 9B:
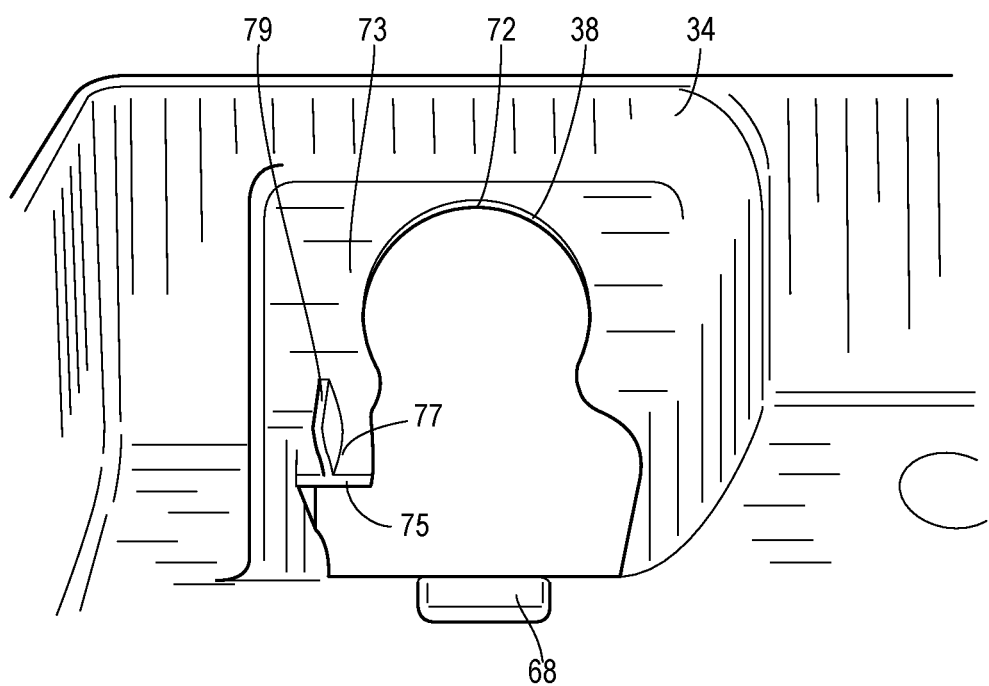
FIG. 9B is a perspective view of an interior portion of the liner of the vacuum cleaner assembly.

As depicted in FIG. 9B, an interior area of the liner 34 includes an angled wall section 73 having the air intake opening 38 disposed in a center portion of the angled wall section 73 and the edge 72 partially surrounding the air intake opening 38. An extending member 75 extends from one side of the angled wall section 73 and includes a surface 77 having a rib 79.

The rib 79 is disposed perpendicular to the surface 77.

So configured, when the canister assembly 32, e.g., the canister 35, is being removed from the liner 34, one or more of the extending member 75, the surface 77 of the extending member 75, and/or the rib 79 guide the tab 59 of the moveable member 52 away from the liner 34 to help control the closing of the moveable member 52. Said another way, surfaces of one or more of the extending member 75, the rib 79, and the tab 59 cams the moveable member 52 away from the liner 34 during removal of the canister 35, helping to control the closing action of the moveable member 52 when the canister 35 is being removed from the liner 34. In addition, the interaction of these surfaces also guide the moveable member 52 away from a seal (not depicted), such as an o-ring, used when the hose is snapped into the air intake opening 38 of the liner 34, preventing interference with the seal mounting. In one example, the seal may be disposed around the air intake opening 38, such as around the edge 72 partially surrounding the air intake opening 38.

Figure 10:
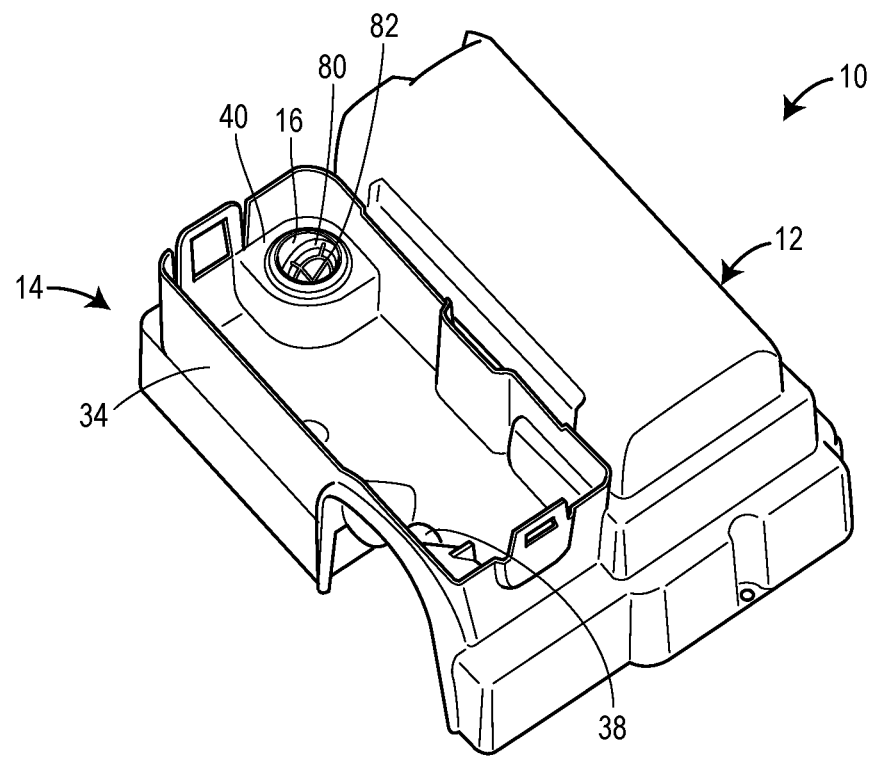
FIG. 10 is a top, rear perspective view of the vacuum cleaner assembly of FIG. 1, with the canister assembly removed from the liner of the vacuum cleaner assembly, and a portion of an elbow assembly having a foam section and a grill insert depicted.
Figure 11:
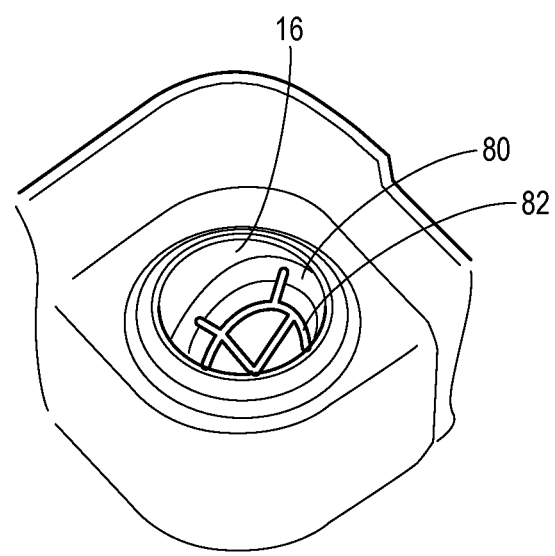
FIG. 11 is a close-up view of a portion of FIG. 10, depicting the foam section and the grill insert of the elbow assembly.

Referring now to FIG. 10, the vacuum cleaner assembly 10 is depicted, with the vacuum module 12 coupled to the collector module 14 by way of the elbow assembly 16, and the canister assembly 32 is entirely removed from the liner 34 of the collector module 14. Generally, and as depicted in FIGS. 10 and 11, a portion of the elbow assembly 16 includes foam section 80 and a grill insert 82 for maintaining the foam section 80 within the elbow assembly 16, as explained more below. When the canister assembly 32 is removed from the liner 34 of the collector module 14, the flapper valve 50 remains attached to the canister assembly 34 in a closed position to keep debris in the canister assembly 34 and the foam section 80 and the grill insert 82 remain in place within the elbow assembly 16 to prevent debris and other materials from entering the airflow path of the elbow assembly, for example.

Figure 12:
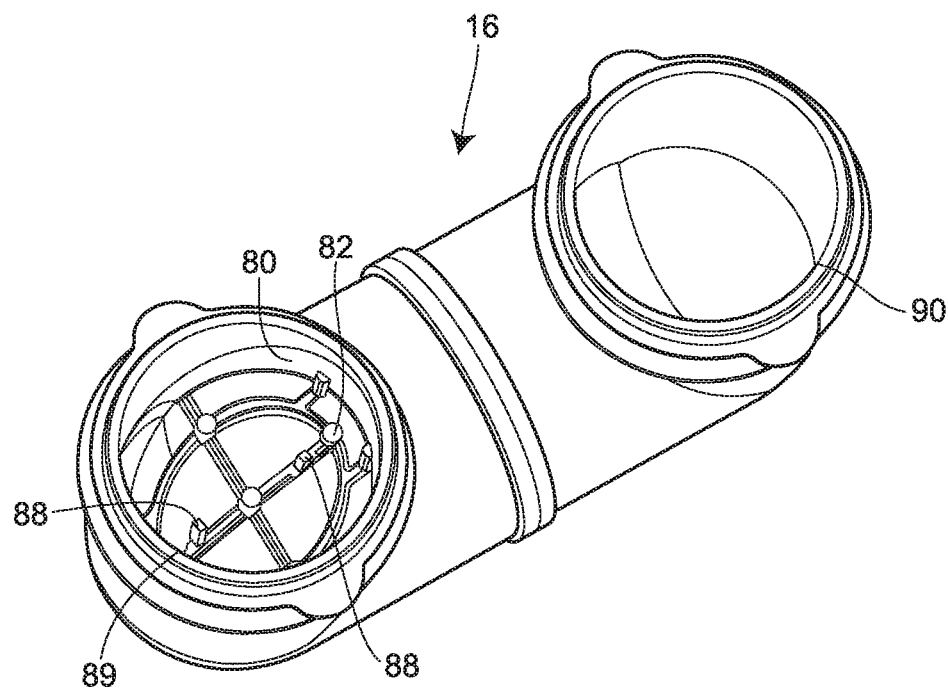
FIG. 12 is a perspective view of the elbow assembly of the vacuum cleaner assembly, the elbow assembly including the foam section and the grill insert.

Referring now to FIGS. 12 and 13, the elbow assembly 16 includes an intake end 84, an output end 85, and a body 87 disposed between the intake end 84 and the output end 85. The intake end 84 is adapted to be attached to the air exhaust opening 40 of the collector module 14 and the output port 46 of the canister assembly 32 when the canister assembly 32 is disposed within the liner 34 of the collector module 14. The foam section 80 and the grill insert 82 are disposed in the intake end 84 of the elbow assembly 16. In one example, the grill insert 82 is disposed in an angled position, such as at a 45 degree angle adjacent to the foam section 80. In another example, the grill insert 82 locks in place when disposed at a 45 degree angle location within the intake end 84 of the elbow assembly 16 due to the press fit placement between ends of the grill insert 82 and inside surfaces of the elbow assembly 16, for example. The cross-sectional area of the 45 degree angle location is larger than other cross-sectional areas of the elbow assembly 16, creating less restriction and allowing the grill insert 82 to be removed from the elbow assembly 16 when needed.

As depicted in FIG. 13, the foam section 80 is disposed closer to an opening 86 of the intake end 84 of the elbow assembly 16 than the grill insert 82. Said another way, the foam section 80 is disposed between the opening 86 of the intake end 84 and the grill insert 82. The grill insert 82 is snapped into the intake end 84 of the elbow assembly 16 and is only removable upon severely deflecting the grill insert 82. In another example, the grill insert 82 includes at least one barbed portion 88, and in one example, two barbed portions 88 that are molded into the grill insert 82 and extend from a surface of the grill insert 82 on which the foam section 80 is disposed. The one or more barbed portions 88 one or more of hold or latch onto the foam section 80 upon insertion of the foam section 80 into the elbow assembly 16 and onto the surface of the grill insert 82. More specifically, the foam section 80 is placed onto the surface of the grill insert 82 and the at least one barbed portion 88 holds the foam section 80 in place immediately adjacent to the grill insert 82. The at least one barbed portion 88 also allows the foam section 80 to be pulled off and cleaned, as needed. The grill insert 82 provides a needed structure on which the foam section 80 is disposed upon within the elbow assembly 16 to keep the foam section 82 in place while under vacuum pressure, for example.

FIG. 13 depicts the airflow path during use of the vacuum cleaner assembly 10. In this example, airflow from vacuum pressure pulls air through the opening 89 of the intake end 84 of the elbow assembly 16, through the body 87 of the elbow assembly 16, and through an opening 90 of the output end 85 of the elbow assembly 16. While the vacuum cleaner assembly 10 is operating and airflow from vacuum pressure flows through the foam section 80, the foam section 80 is maintained in a stationary position due to the grill insert 82, for example, as explained above.

In addition, and in another example, while the vacuum cleaner assembly 10 is described and depicted as having a modular configuration, the vacuum cleaner assembly 10 may alternatively include a non-modular configuration having the same features of the foregoing present disclosure and still fall within the scope of the present disclosure. For example, the vacuum module 12 of the vacuum cleaner assembly may comprise a vacuum unit and the collector module 14 may comprise a collector. In addition, the elbow assembly 16 may couple the vacuum unit to the collector in a non-modular configuration and function in the same manner as the elbow assembly 16 functions in the modular configuration. Still further, the flapper valve 50 may be attached to the canister assembly 32 of the collector 14, for example, and likewise function in the same manner the flapper valve 50 functions for the modular configuration.

In view of the foregoing, it will be understood that the vacuum cleaner assembly assembly 10 of the present disclosure has several advantages. For example, the foam section 80 and the grill insert 82 remain in place during operation of the vacuum cleaner assembly assembly 10 and when the canister assembly 32 is removed from the liner 34, which helps prevent debris or other materials from entering the airflow path. During removal of the canister assembly 32 from the liner 34, debris is retained within the canister 35 because the flapper valve 50 remains attached to the canister 35 and automatically moves to the closed position. So configured, this further prevents debris from falling out of the canister 35, creating a more seamless and cleaner removal of the canister assembly 32 from the liner 34 of the collector module 14 when the canister 35 is emptied, for example.

Moreover, while the operator of the vacuum cleaner assembly 10 of the present disclosure needs to lock the flapper valve 50 into a fully open position, as explained above, other required operator actions are reduced. For example, after the operator secures the flapper valve 50 into a fully open position, the canister assembly 32 is ready to be disposed within the liner 34 of the collector module 14. Upon lowering the canister assembly 32 into the liner 34, the flapper valve 50 contacts a portion of the liner 34, causing the flapper valve 50 to automatically move from the secured and/or locked position to an unlocked position. In addition, upon further movement into the liner 34, the moveable member 52 of the flapper valve 50 is in an open position, such that access to the intake port 44 of the canister assembly 32 is open and a hose may be secured to the same for use with the vacuum cleaner assembly 10. When the canister assembly 32 is removed from the liner 34 to dispose of debris within the canister 35, for example, the moveable member 52 of the flapper valve 50 automatically moves to the closed position over the intake port 44 of the canister assembly 32, as the flapper valve 50 is biased in the closed position over the intake port 44. As a result, the vacuum cleaner assembly 10 requires less time to operate and is more efficient than conventional vacuum cleaner assemblies.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described herein, it is understood that the appended claims are not intended to be limited thereto, and may include variations that are still within the literal or equivalent scope of the claims.

What is claimed:

1. A vacuum cleaner assembly configured to be mounted in a vehicle, the vacuum cleaner assembly comprising:
   a vacuum module configured to draw a vacuum;
   a collector module configured to collect debris and operatively coupled to the vacuum module, the collector module having a canister assembly including an intake port, an output port, and a flapper valve coupled to the intake port;
   an elbow assembly coupling the vacuum module to the collector module, the elbow assembly having an intake end attached to the output port of the canister assembly and a foam section disposed on a grill insert for maintaining the foam section in place, the foam section and the grill insert disposed within the elbow assembly,
   where, upon removal of the canister assembly from the collector module, the flapper valve moves to a closed position over the intake port of the canister assembly to keep debris contained in the canister assembly, and the grill insert and the foam section remain in place in the intake end of the elbow assembly, and where the grill insert is disposed in an angled position relative to the intake end within the elbow assembly to maintain the foam section in place within the elbow assembly and the foam section disposed closer to an opening in the intake end of the elbow assembly than the grill insert.

2. The vacuum cleaner assembly of claim 1, wherein the grill insert is disposed within the elbow assembly at a 45 degree angle location.

3. The vacuum cleaner assembly of claim 1, the collector module including a liner, and the flapper valve having a moveable member disposed in a hinged configuration about the intake port, the moveable member biased in a closed position over the port and having a tab guided by at least one surface of the liner when the canister assembly is being removed from the collector module.

4. The vacuum cleaner assembly of claim 1, the canister assembly further comprising a canister having a bottom portion and a locking member disposed on the bottom portion of the canister.

5. The vacuum cleaner assembly of claim 3, the moveable member having an outside surface with a projection extending therefrom, such that when the moveable member is moved to a fully open position, the projection snaps over a locking member.

6. The vacuum cleaner assembly of claim 3, wherein, when the canister assembly is lowered into the liner of the collector module, the flapper valve is disposed in a fully open position, and a tab of the flapper valve contacts an angled portion of the liner, forcing the projection of the flapper valve to become detached from a locking member.

7. The vacuum cleaner assembly of claim 6, when the canister assembly is disposed within the liner, the moveable member moves in a direction to contact an edge of the liner, and the moveable member is in an open position for operation of the vacuum cleaner assembly.

8. The vacuum cleaner assembly of claim 3, wherein the liner includes an interior area having an angled wall section with an extending member, the extending member including a surface having a rib, such that one or more of the extending member, the surface or the rib guide the tab of the moveable member to help control the closing of the moveable member when the canister assembly is being removed from the collector module.

9. A vacuum cleaner assembly configured to be mounted in a vehicle, the vacuum cleaner assembly comprising:
a vacuum unit configured to draw a vacuum;
a collector configured to collect debris and operatively coupled to the vacuum unit, the collector having a canister assembly including an intake port and an output port;
an elbow assembly coupling the vacuum unit to the collector, the elbow assembly having an intake end attached to the output port of the canister assembly and a foam section disposed on a grill insert for maintaining the foam section in place, the foam section and the grill insert disposed within the elbow assembly,
where, upon removal of the canister assembly from the collector, the foam section remains in place in the intake end of the elbow assembly, and
where the grill insert is disposed in an angled position relative to the intake end within the elbow assembly to maintain the foam section in place within the elbow assembly.

10. The vacuum cleaner assembly of claim 9, wherein the canister assembly further comprises a flapper valve attached to the intake port, and, upon removal of the canister assembly from the collector, the flapper valve moves to a closed position to keep debris contained in the canister assembly.

11. The vacuum cleaner assembly of claim 9, wherein the grill insert is disposed within and locked into the intake end of the elbow assembly at a 45 degree angle position, the foam section disposed between an opening in the intake end of the elbow assembly and the grill insert, and the 45 degree angle position has a greater cross-sectional area than other locations disposed within the elbow assembly.

12. A vacuum cleaner assembly configured to be mounted in a vehicle, the vacuum cleaner assembly comprising:
a vacuum unit configured to draw a vacuum;
a collector configured to collect debris and operatively coupled to the vacuum unit, the collector having a liner and a canister assembly configured to be disposed on the liner, the canister assembly having an intake port, an output port, and a flapper valve attached to the intake port;
where, upon removal of the canister assembly from the collector, the flapper valve moves to a closed position to keep debris contained in the canister assembly, and
wherein, when the canister assembly is lowered into the liner of the collector, the flapper valve is disposed in a fully open position, and a tab of the flapper valve contacts an angled portion of the liner, forcing the projection of the moveable member of the flapper valve to become detached from a locking member.

13. The vacuum cleaner assembly of claim 12, further comprising an elbow assembly coupling the vacuum unit to the collector, the elbow assembly having an intake end attached to the output port of the canister assembly and a foam section disposed on a grill insert, the grill insert for maintaining the foam section in place.

14. The vacuum cleaner assembly of claim 13, where the grill insert and the foam section remain in place in the intake port of the collector during operation of the vacuum cleaner assembly and removal of the canister assembly from the collector.

15. The vacuum cleaner assembly of claim 12, the flapper valve having a moveable member disposed in a hinged configuration about the intake port, the moveable member biased in a closed position over the intake port and including a tab.

16. The vacuum cleaner assembly of claim 12, the canister assembly further comprising a canister having a bottom portion and a locking member disposed on the bottom portion of the canister.

17. The vacuum cleaner assembly of claim 12, the moveable member having an outside surface with a projection extending therefrom, such that when the moveable member is moved to an open position, the projection snaps over the locking member.

18. The vacuum cleaner assembly of claim 12, wherein, when the canister assembly is fully disposed within the liner, the moveable member moves in a direction to contact an edge of the liner, and the moveable member is in an open position for operation of the vacuum cleaner assembly.

19. The vacuum cleaner assembly of claim 15, wherein the liner includes an interior area having an angled wall section with an extending member, the extending member including a surface having a rib, such that one or more of the extending member, the surface, and the rib guide the tab of the moveable member to help control the closing of the moveable member when the canister assembly is being removed from the collector.

* * * * *